Feb. 26, 1935.  G. S. PEARSON  1,992,837

VARIABLE SPEED TRANSMISSION

Filed July 24, 1933  2 Sheets-Sheet 1

INVENTOR
GUSTAVE S. PEARSON
By Paul, Paul & Moore
ATTORNEYS

Feb. 26, 1935.　　　　G. S. PEARSON　　　　1,992,837
VARIABLE SPEED TRANSMISSION
Filed July 24, 1933　　　2 Sheets-Sheet 2

INVENTOR
GUSTAVE S. PEARSON
By Paul, Paul & Moore
ATTORNEYS

Patented Feb. 26, 1935

1,992,837

UNITED STATES PATENT OFFICE 1,992,837

VARIABLE SPEED TRANSMISSION

Gustave S. Pearson, Wayzata, Minn.

Application July 24, 1933, Serial No. 681,894

7 Claims. (Cl. 74—374)

This invention relates to new and useful improvements in variable speed transmissions and more particularly to such a transmission which may readily be adapted for use in connection with automotive vehicles.

The invention concerns itself more particularly with the provision of a transmission which may take the place of the usual selective type gear transmission now commonly used in automobiles, and wherein it is necessary to selectively shift gears into and out of mesh with one another to vary the speed of the vehicle. Such selective gear transmissions are more or less objectionable because of having to shift gears into and out of mesh with one another, particularly when operated by an inexperienced person. To thus shift the gears necessitates the timed manipulation of the usual clutch so that the gears may be free when the shift is made. Otherwise, there is danger of stripping the gear teeth. Various devices and mechanisms have been developed to facilitate the shifting of transmission gears, and have been successful to a certain extent, but they are complicated and therefore expensive in construction, and the objectionable feature of shifting the gears into and out of mesh with one another is still present.

The novel transmission herein disclosed positively eliminates gear shifting. It comprises a plurality of sets of constantly meshing ring gears and pinions, and a member rotatably supporting said ring gears, and a drive shaft to which the pinions are secured in fixed relation, and a mechanism for selectively rendering said sets of gears and pinions operative to provide a driving connection between the member and shaft, and whereby the changing from one speed to another will be smooth and substantially noiseless as compared to variable speed transmissions now commonly used on automobiles.

An object of the invention is to provide a variable speed transmission comprising a member having a plurality of ring gears mounted thereon and adapted for relative rotation, and each ring gear having a pinion in constant mesh therewith, which pinions are secured to a drive shaft whereby the ring gears will always rotate when said pinions are operated, and means being provided for successively locking said ring gears to said member to thereby provide a positive driving connection between the shaft and said member.

Other objects of the invention reside in the particular arrangement of the ring gears on the driven member; and the pinions which are in constant mesh therewith; in the means provided for locking the ring gears to the member; and in the provision of a variable speed transmission which may readily be embodied in the construction of the rear axle assembly of an automobile adjacent to the usual differential thereof, and which comprises a plurality of variable speeds and mechanism for progressively rendering said speeds operative by the simple manipulation of a single control member conveniently located adjacent the driver's seat.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
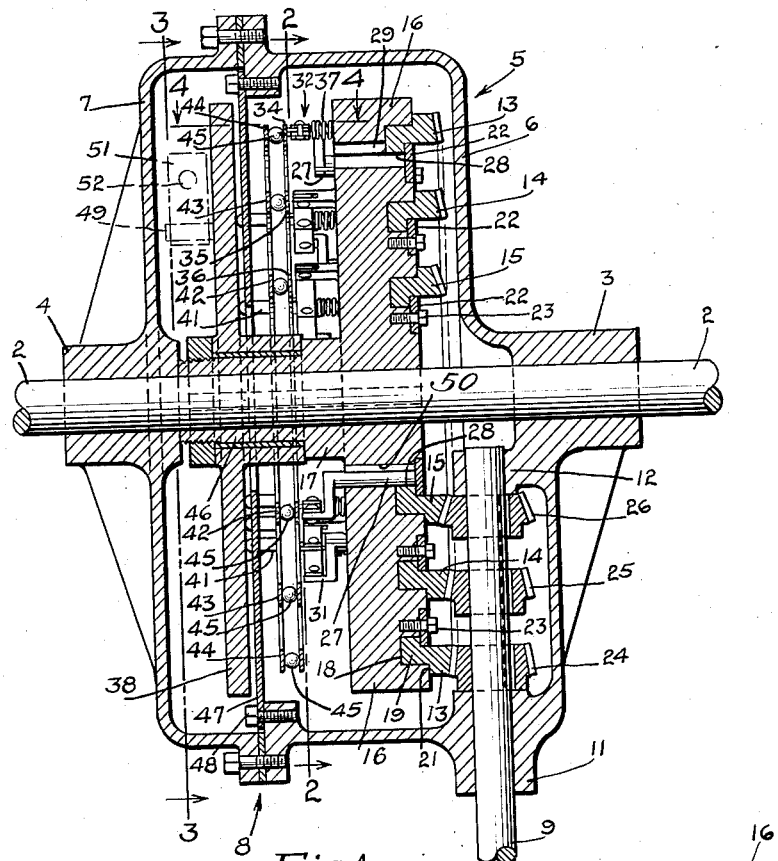
Figure 1 is a cross-sectional view of my improved transmission showing the general construction thereof.

In the selected embodiment of the invention here shown, there is illustrated in Figure 1, a shaft 2 mounted in suitable bearings 3 and 4 of a housing generally indicated by the numeral 5. The housing is shown comprising two sections 6 and 7 suitably bolted together, as shown at 8. A drive shaft 9 is shown supported in suitable bearings 11 and 12 provided in the section 6 of the housing 5. The opposite end of the shaft 9 may be operatively connected to an automobile engine by means of a suitable clutch, not shown.

An important feature of the present invention resides in the means provided for operatively connecting together the drive shaft 9 and driven shaft 2 to obtain a plurality of variable speeds without the necessity of having to shift gears, as is now common practice. To thus operatively connect together the shafts 9 and 2, a plurality of ring gears 13, 14, and 15 are mounted in a member 16, shown having a hub 17 bored to receive the shaft 2 and to which it is suitably secured.

To support the ring gears on the member 16, the latter is shown provided with a plurality of annular grooves 18 adapted to receive annular portions 19 of the ring gears 13, 14, and 15, as clearly shown in Figure 1. The annular portions 19 of the ring gears are each shown provided with a shoulder 21 adapted to be engaged by a retaining ring 22 secured to the member 16 by suitable bolts 23. The ring gears are mounted for relative rotation in the member 16.

A plurality of pinions 24, 25, and 26 are suitably keyed to the drive shaft 9 and are in constant mesh with their respective ring gears, as clearly illustrated in Figure 1. Thus, it will be seen that when the shaft 9 is driven, all of the ring gears will be simultaneously rotated in the member 16, but at different speeds, resulting because of the variation in the diameters of the ring gears.

Figures 2A, 4, 5:
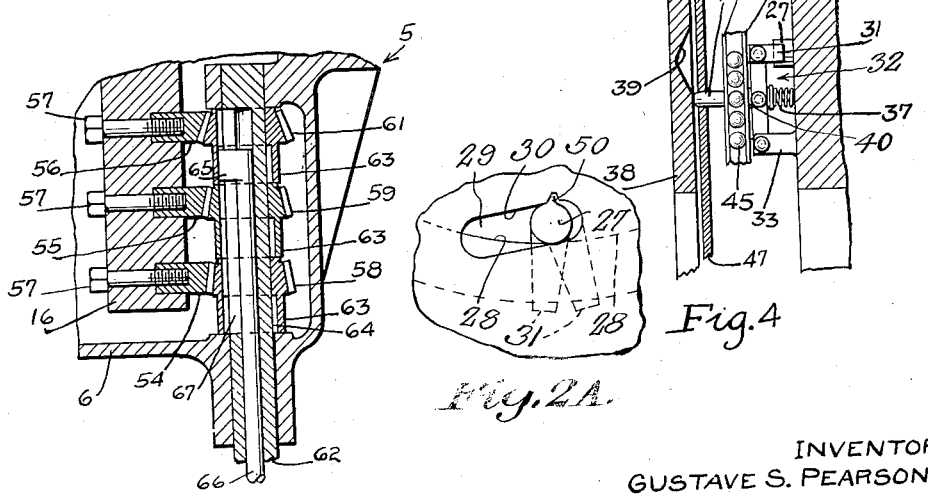
Figure 2A is an enlarged detail sectional view to more clearly illustrate the construction of the locking means.
Figure 4 is a detail sectional view on the line 4—4 of Figure 1.
Figure 5 is a view illustrating a construction wherein the ring gears are fixedly secured to the member, and the pinions are mounted for relative rotation upon the drive shaft.
Figure 2:
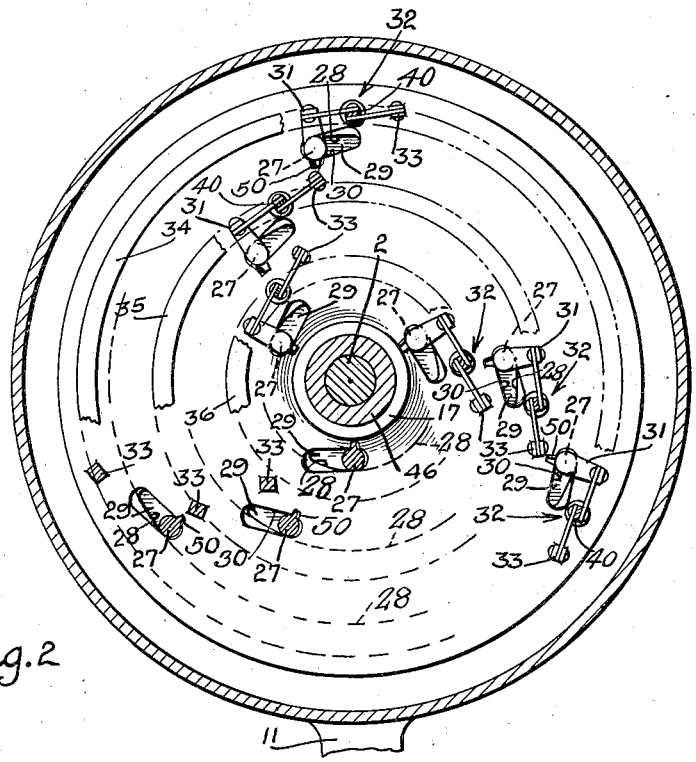
Figure 2 is a cross-sectional view on the line 2—2 of Figure 1, showing the means for successively locking the ring gears to their supporting member.

To obtain a driving connection between the drive shaft 9 and the driven shaft 2, means is provided for successively locking the ring gears to the member 16. Such a mechanism is shown in the drawings and consists of a plurality of cylindrical locking elements or rollers 27 mounted to engage the inner circular wall portions 28 of the bores of the ring gears, as best shown in Figures 1 and 2A. The eccentric elements or rollers 27 are supported in suitable elongated apertures 29, provided in the member 16. These apertures are arranged as shown in Figures 2 and 2A, whereby the inner walls 30 thereof are angularly disposed with respect to the adjacent wall portions 28 of the bores of their respective ring gears 13, 14, and 15. Each locking element 27 is provided with a crank arm 31 having a toggle device, generally indicated by the numeral 32, connected thereto. These toggle devices also have pivotal connections with the supporting member 16, as indicated at 33 in Figure 4. In the drawings, I have shown three toggle devices for each ring gear primarily for the purpose of equalizing the strains, and whereby each ring gear may be locked to the supporting member 16 at a plurality of points around its circumference. The toggle devices for each ring gear are shown operatively connected together by a plurality of annular members 34, 35, and 36, and said toggle device may be provided with suitable compression springs 37 for urging the annular members 34, 35, and 36 outwardly into positions whereby the locking elements 27 will operatively secure or lock their respective ring gears to the supporting member 16. The annular members 34, 35, and 36 are operatively connected to the center pivots of their respective toggle devices 32, as indicated at 40 in Figures 2 and 4.

To actuate the toggle devices 32, there is shown in the drawings, a cam disk 38 having a plurality of cam faces 39 adapted to be engaged by a series of pins 41 secured to a plurality of annular members 42, 43, and 44 which are operatively connected to the correspondingly shaped members 34, 35, and 36 by suitable anti-friction thrust bearings 45. The cam disk 38 may be rotatably supported upon a reduced extension 46 provided upon the hub 17 of the supporting member 16. A retaining disk 47 is shown secured to the section 6 of the housing 5 by suitable bolts 48, and has a plurality of apertures therein adapted to receive the pins 41, as best shown in Figure 4, thereby to prevent relative rotation of the annular members 42, 43, and 44. The complemental members 34, 35, and 36 of the toggle devices, it is to be understood, rotate with the member 16.

Figure 3:
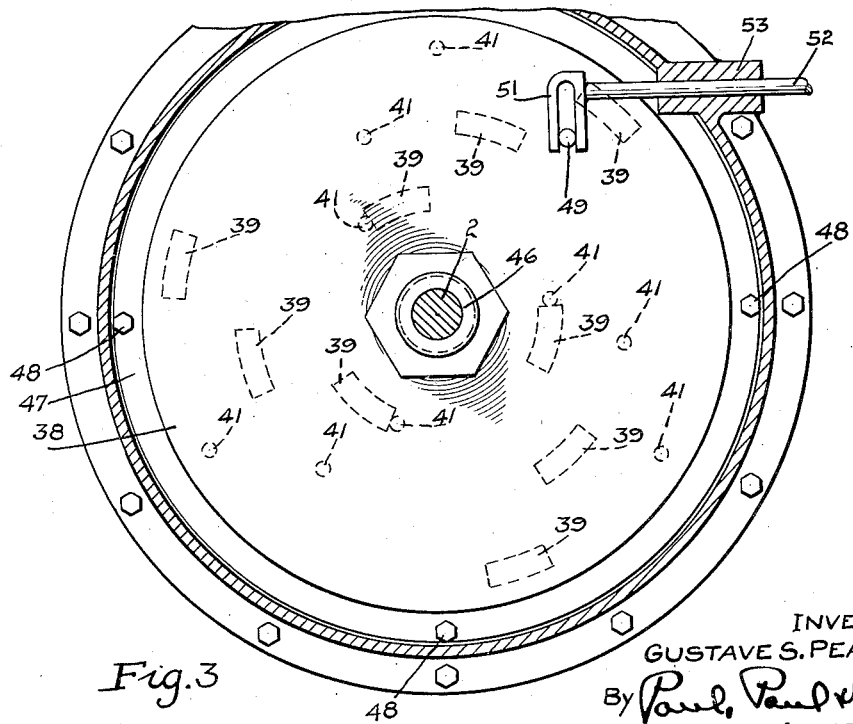
Figure 3 is a cross-sectional view on the line 3—3 of Figure 1, showing a member for actuating the mechanism for successively locking the ring gears to the member.

The cam disk 38 may be provided with a pin 49 adapted to be engaged by a fork 51 secured to one end of an operating rod 52, slidably mounted in a guide 53 provided in the section 7 of the housing 5, as clearly illustrated in Figure 3.

*Operation*

In the operation of this novel transmission, it is to be understood that the ring gears 13, 14, and 15 are normally free to rotate in their respective bearings in the member 16, and if the drive shaft 9 is being driven, the ring gears will constantly rotate in the member 16 in the direction indicated by the arrows in Figure 2 without imparting relative rotation thereto.

When it is desired to operatively connect the member 16 to the drive shaft 9, the operating rod 52 is manipulated to cause the pins 41 of the outer ring gear 13 to drop into their respective cam depressions 39, shown in Figure 4, whereupon the springs 37 of the toggle devices 32 associated with said ring gear 13 will operate said devices to cause the locking elements 27 connected thereto to be relatively rotated, whereby they will lock the selected ring gear 13 to the supporting member 16, and cause said member to be positively driven with the shaft 9 at a lower speed, as will readily be understood by referring to Figure 2A. Each locking element 27 is shown interlocked with the wall 30 of its respective slot 29, as indicated at 50 in Figures 2 and 2A, whereby, when the toggle devices 32 are operated, the locking elements 27 move into wedging engagement with the wall portions 28 and 30 of the ring gear and slot, respectively, and thereby securely lock the ring gear 13 to the member 16 for direct rotation therewith.

To increase the speed of the member 16 or shaft 2, the operator will further manipulate the operating rod 52, whereupon the pins 41 of the toggle devices 32 of the intermediate ring gear 14 will drop into their respective cam slots 39, whereby the ring gear 14 will rotate the member 16 at a relatively higher speed because of the smaller diameter of said ring gear 14. In like manner, when the operating rod is still further moved in the same direction, the pins 41 of the inner ring gear 15 will be received in their cam depressions 39, whereupon said ring gear will become operative to drive the member 16 at a still higher rate of speed because of said gear being smaller in diameter than the ring gear 14.

The cam depressions 39 of the ring gears 13, 14, and 15 are so arranged in the cam disk 38, that when shifting from one speed to another, the locking elements 27 of the ring gear of the next following speed, will become operative to lock said ring gear to the member 16, before the ring gear of the previous speed is released from the member 16, whereby the driven shaft 2 is always under control. This results because of the construction of the locking elements 27 and the slots 29, which is such that when, for example, the slow speed ring gear 13 is functioning, and the control rod 52 is actuated to render the ring gear 14 of the intermediate speed operative, then the locking elements 27 of the ring gear 14 will become operative and thereby rotate the driven member 16 at a relatively higher speed than the slow speed ring gear 13, whereby the locking elements 27 of the ring gear 13 will be rendered inoperative while the locking elements of the ring gear 14 are thus operating. The mechanism operates in substantially the same manner when shifting from intermediate to high speed.

Thus, it will be seen that one or the other of the ring gears is always operatively connected to the driven member 16, regardless of whether the mechanism is being progressively shifted from low, through intermediate, to high; or from high, through intermediate to low, whereby the driven shaft 2 is always under control.

It is to be understood that the cam slots 39 are so arranged that before one set of pins 41 drop into their respective slots 39, all other pins which may have been received in their respective slots 39 will be moved out of said slots, so that only one ring gear can be rendered operative to drive the member 16 at a time. To reduce the speed of the member 16, the operating rod 52 is moved in the opposite direction, whereupon the ring gears will be progressively rendered operative from the high to the low speed. It will thus be seen that the ring gears and pinions are always in constant mesh, whereby the shifting from one speed to another may be accomplished smoothly and without noise. All of the operating parts of the mechanism are contained within the housing 5, into which a suitable lubricant may be introduced.

In the drawings, I have shown three different speeds, but it is to be understood that four or more speeds may be employed if desired, the number of speeds being limited only by the size of the member 16. When the apparatus is used in connection with an automobile, suitable means, not shown, is provided for reversing the direction of rotation of the shaft 9.

Figure 5 illustrates a modified construction wherein the member 16 is shown provided with a plurality of ring gears 54, 55, and 56, which are rigidly secured thereto by suitable bolts 57. In the construction here shown, a plurality of pinions 58, 59, and 61 are shown rotatably mounted upon a drive shaft 62, and each has a hub 63 provided with an enlarged bore 64 adapted to receive a key member 65 provided upon one end of an operating rod 66. The operating rod is slidably mounted in the shaft 62, and the key 65 thereof is slidable in a slot 67 provided in said shaft. Each pinion has a suitable key-way adapted to receive the key 65.

By means of the counterbores 64 in the hubs of the pinions 63, the key 65, when positioned as shown in Figure 5, is inoperative, and the shaft 62 may then be rotated without imparting any rotation to the pinions. When it is desired to drive the member 16, the operating rod 66 is actuated to move the key member 65 into engagement with a selected pinion, whereby said pinion will be operatively connected to the shaft 62, and as a result of the pinion being in constant mesh with its respective ring gear, the supporting member 16 will be driven.

As hereinbefore stated, the transmission is particularly well suited for automobile use, but it is to be understood that it may be used for various other purposes where applicable, without departing from the scope of the invention.

I claim as my invention:

1. In a variable speed transmission, a driven shaft, a member secured thereto and having a plurality of ring gears mounted therein and adapted for relative rotation independently of one another, a pinion meshing with each ring gear, a drive shaft to which said pinions are secured, a plurality of eccentric elements movably supported in said member and engaging said ring gears, and means for actuating said eccentric elements whereby the ring gears are successively locked to said member, to thereby vary the speed of said driven shaft.

2. In a variable speed transmission, a driven shaft, a member secured thereto, a plurality of ring gears mounted in said member and adapted for relative rotation with respect thereto, a pinion constantly meshing with each ring gear, a drive shaft to which said pinions are secured in fixed relation, said member having a plurality of elongated apertures therein, an eccentric element in each of said apertures having portions adapted to engage said ring gears, and means for actuating said eccentric elements to thereby successively lock said ring gears to the member whereby the speed of said driven shaft may be varied.

3. In a variable speed transmission, a driven shaft, a member secured thereto, a plurality of ring gears mounted in said member and adapted for relative rotation with respect thereto, a pinion constantly meshing with each ring gear, a drive shaft to which said pinions are secured in fixed relation, said member having a plurality of elongated slots therein, a locking element in each of said slots engaging said ring gears, and means for actuating said locking elements to thereby successively lock said ring gears to the member whereby the speed of said driven shaft may be varied.

4. In a variable speed transmission, a driven shaft, a member secured thereto and having a plurality of annular grooves in a face thereof, ring gears mounted in said grooves and normally free to rotate therein, pinions constantly meshing with said ring gears, a drive shaft for said pinions, said member having a plurality of elongated apertures extending axially therethrough, a cylindrical locking element in each of said apertures and operatively associated with said ring gears, and means for operating said locking elements to thereby successively secure said ring gears to said member, whereby the speed of the driven shaft may be varied.

5. In a variable speed transmission, a driven shaft, a member secured thereto and having a plurality of annular grooves in a face thereof, a ring gear mounted in each of said annular grooves and adapted for relative rotation therein, a pinion constantly meshing with each ring gear, a drive shaft for said pinions, said member having a plurality of elongated apertures extending axially therethrough, a cylindrical locking element in each of said apertures and interlockingly engaged with the walls thereof, a crank arm at one end of each element, a toggle mechanism operatively connected with each of said crank arms, and means whereby the toggle mechanisms of said ring gears may be operated, to thereby actuate said locking elements and successively lock the ring gears to said member, whereby the speed of the driven shaft may be varied.

6. In a variable speed transmission, a driven shaft, a member secured thereto and having a plurality of annular grooves in a face thereof, a ring gear mounted in each groove and adapted for relative rotation therein, a pinion constantly meshing with each ring gear, a drive shaft to which said pinions are secured in fixed relation, said member having a plurality of elongated apertures extending axially therethrough, a cylindrical locking element in each of said apertures and operatively associated with said ring gears, each of said elements having a crank arm at one end, an operating mechanism for said crank arms comprising a thrust ring for each ring gear, means operatively connecting the thrust rings to the crank arms of their respective locking elements, and a cam disk operatively connected to said thrust rings and adapted to actuate said thrust rings, one at a time, whereby the ring gears are successively secured to said member.

7. In a variable speed transmission, a driven shaft, a member secured thereto and having a plurality of annular grooves in a face thereof, a ring gear mounted in each groove and adapted for relative rotation therein, a pinion constantly meshing with each ring gear, a drive shaft for said pinions, said member having a plurality of elongated slots therein extending axially therethrough, a cylindrical locking element in each of said slots and operatively associated with said ring gears, each of said elements having a crank arm at one end, an operating mechanism for said crank arms comprising a thrust ring for each ring gear, means operatively connecting the thrust rings to the crank arms of their respective locking elements, means for preventing relative rotation of said thrust rings, and a cam disk having operative connections with said thrust rings and adapted to progressively actuate said thrust rings, whereby the ring gears are successively secured to said member.

GUSTAVE S. PEARSON.